(12) United States Patent
Kotalwar et al.

(10) Patent No.: US 10,833,880 B2
(45) Date of Patent: Nov. 10, 2020

(54) CONTROLLED SWITCHING OF MULTICAST TRAFFIC BETWEEN SELECTIVE AND INCLUSIVE ROUTES BASED ON NUMBER OF MULTICAST RECEIVERS

(71) Applicants: Alcatel-Lucent USA Inc., Murray Hill, NJ (US); Alcatel-Lucent Canada Inc., Ottawa (CA)

(72) Inventors: Jayant Kotalwar, Cupertino, CA (US); Andrew Dolganow, Ottawa (CA); Gitesh Patel, Fremont, CA (US)

(73) Assignees: Nokia Technologies Oy, Espoo (FI); Nokia of America Corporation, Murray Hill, NJ (US)

( * ) Notice: Subject to any disclaimer, the term of this patent is extended or adjusted under 35 U.S.C. 154(b) by 1256 days.

(21) Appl. No.: 14/559,442

(22) Filed: Dec. 3, 2014

(65) Prior Publication Data

US 2016/0043876 A1 Feb. 11, 2016

Related U.S. Application Data

(63) Continuation-in-part of application No. 14/454,271, filed on Aug. 7, 2014, now Pat. No. 9,473,315.

(51) Int. Cl.
*H04L 12/18* (2006.01)
*H04L 12/46* (2006.01)
(Continued)

(52) U.S. Cl.
CPC .......... *H04L 12/18* (2013.01); *H04L 12/4633* (2013.01); *H04L 12/4641* (2013.01);
(Continued)

(58) Field of Classification Search
CPC ..... H04L 12/18; H04L 12/4633; H04L 12/44; H04L 12/4641; H04L 45/16; H04L 45/302; H04L 45/48; H04L 47/15
(Continued)

(56) References Cited

U.S. PATENT DOCUMENTS 7,570,605 B1 * 8/2009 Aggarwal ............... H04L 12/18
370/256
7,751,405 B1 7/2010 Kompella
(Continued)

FOREIGN PATENT DOCUMENTS

CN 1852236 A 10/2006
CN 101001194 A 7/2007
(Continued)

OTHER PUBLICATIONS

R. Aggarwal et al., "Extranet in BGP Multicast VPN (MVPN)," Network Working Group, Internet Draft, Feb. 2010, 14 pages.
(Continued)

*Primary Examiner* — Kwang B Yao
*Assistant Examiner* — Syed M Bokhari
(74) *Attorney, Agent, or Firm* — Ryan, Mason & Lewis, LLP

(57) ABSTRACT

A first network device adapted for communication with one or more other network devices is configured to determine a number of receivers of a multicast, and to control switching of traffic between selective and inclusive routes for the multicast based at least in part on the determined number of receivers. For example, in some embodiments the first network device is configured to control switching of traffic between the selective and inclusive routes for the multicast by utilizing a selective route for the multicast responsive to a determination that traffic for the multicast is at or above a bandwidth threshold and the number of receivers is below an
(Continued)

add threshold, and utilizing an inclusive route for the multicast responsive to a determination that traffic for the multicast is below the bandwidth threshold or the number of receivers is above a delete threshold.

20 Claims, 7 Drawing Sheets

(51) Int. Cl.
*H04L 12/761* (2013.01)
*H04L 12/801* (2013.01)
*H04L 12/725* (2013.01)
*H04L 12/753* (2013.01)

(52) U.S. Cl.
CPC ............ *H04L 45/16* (2013.01); *H04L 45/302* (2013.01); *H04L 45/48* (2013.01); *H04L 47/15* (2013.01)

(58) Field of Classification Search
USPC ........................ 370/235, 256, 390, 315, 250
See application file for complete search history.

(56) References Cited

U.S. PATENT DOCUMENTS

| | | | |
|---|---|---|---|
| 7,756,072 B1 | 7/2010 | Fenner et al. | |
| 7,983,261 B1 | 7/2011 | Aggarwal et al. | |
| 8,571,029 B1* | 10/2013 | Aggarwal | H04L 45/50 370/256 |
| 9,100,201 B1* | 8/2015 | Pichumani | H04L 12/185 |
| 2006/0007930 A1* | 1/2006 | Dorenbosch | H04L 12/1886 370/390 |
| 2008/0151810 A1* | 6/2008 | Watanabe | H04L 45/32 370/315 |
| 2010/0302952 A1* | 12/2010 | Hoshi | G06F 15/17356 370/250 |
| 2011/0255536 A1 | 10/2011 | Liu et al. | |
| 2014/0003281 A1 | 1/2014 | Han et al. | |
| 2014/0269700 A1* | 9/2014 | Venkataswami | H04L 12/18 370/390 |
| 2014/0301392 A1 | 10/2014 | Jain et al. | |

FOREIGN PATENT DOCUMENTS

| | | |
|---|---|---|
| CN | 102404218 A | 4/2012 |
| EP | 2512067 A1 | 10/2012 |
| WO | 2013139234 A1 | 9/2013 |
| WO | PCT/US2014/033126 | 7/2014 |

OTHER PUBLICATIONS

John Hardwick, "IP Multicast Explained," Data Connection Limited, Jun. 2004, 69 pages.
B. Fenner et al., "Protocol Independent Multicast—Sparse Mode (PIM-SM): Protocol Specification (Revised)," Network Working Group, Request for Comments: 4601, Aug. 2006, 112 pages.
D. Farinacci et al., "Anycast-RP Using Protocol Independent Multicast (PIM)," Network Working Group, Request for Comments: 4610, Aug. 2006, 12 pages.
Y. Rekhter et al., "A Border Gateway Protocol 4 (BGP-4)," Network Working Group, Request for Comments: 4271, Jan. 2006, 104 pages.
E. Rosen et al., "BGP/MPLS IP Virtual Private Networks (VPNs)," Network Working Group, Request for Comments: 4364, Feb. 2006, 47 pages.
J. De Clercq et al., "BGP-MPLS IP Virtual Private Network (VPN) Extension for IPv6 VPN," Network Working Group, Request for Comments: 4659, Sep. 2006, 18 pages.
E. Rosen et al., "Multicast in MPLS/BGP IP VPNs," Internet Engineering Task Force (IETF), Request for Comments: 6513, Feb. 2012, 88 pages.
R. Aggarwal et al., "BGP Encodings and Procedures for Multicast in MPLS/BGP IP VPNs," Internet Engineering Task Force (IETF), Request for Comments: 6514, Feb. 2012, 60 pages.
Juniper Networks, Inc., "NGEN MVPN BGP Route Types and Encodings, Examples for Easy Reference," www.juniper.net, Application Note, Nov. 2008, 4 pages.
Wikipedia, "Finite-State Machine," http://en.wikipedia.org/wiki/Border_Gateway_Protocol, Apr. 2013, 2 pages.
Alcatel-Lucent, "Alcatel-Lucent Data Sheet 7750 Service Router," Release 10, May 2012, 5 pages.
S. Bradner, "Key Words for Use in RFCs to Indicate Requirement Levels," Network Working Group, Request for Comments: 2119, Mar. 1997, 3 pages.
E. Rosen et al., "Wildcards in Multicast VPN Auto-Discovery Routes," Internet Engineering Task Force (IETF), Request for Comments: 6625, May 2012, 17 pages.
Alcatel-Lucent, "Next-Generation Layer 3 Multicast VPN (MVPN) Services," 2010, Application Note, 24 pages.
Juniper Networks, Inc., "NG MVPN BGP Route Types and Encodings, Examples for Easy Reference," www.juniper.net, Application Note, May 2010, 5 pages.
S. Asif et al., "MPLS/BGP Layer 3 VPN Multicast Management Information Base," Internet-Draft, draft-ietf-l3vpn-mvpn-mib-00, May 2012, 31 pages.
S. Asif et al., "MPLS/BGP Layer 3 VPN Multicast Management Information Base," Internet-Draft, draft-ietf-l3vpn-mvpn-mib-04, Oct. 2012, 32 pages.
P. Jain et al., "VPLS with Point-to-Multipoint LSPs Management Information Base," L2 VPN Working Group, Internet-Draft, draft-jain-l2vpn-mcast-vpls-mib-00, Jun. 2012, 26 pages.
Joseph, "Experience with rsvp-te p2mp based mvpn," Network Working Group, Internet Draft, draft-joseph-p2mp-mvpn-experience-00.txt, Aug. 2009, 10 pages.
T. Morin et al., "Multicast VPN Fast Upstream Failover," Network Working Group, Internet-Draft, draft-morin-13vpn-mvpn-fast-failover-00, Nov. 2008, 13 pages.
Y. Cai et al., "MVPN: S-PMSI Join Extensions for mLDP-Created Tunnels," Network Working Group, Internet Draft, draft-rosen-13vpn-spmsi-joins-mldp-02.txt, May 2011, 6 pages.
Y. Cai et al., "PIM Based MVPN Deployment Recommendations," Network Working Group, Internet Draft, draft-ycai-mboned-mvpn-pim-deploy-02.txt, Feb. 2008, 14 pages.
T. Morin et al., "Mandatory Features in a Layer 3 Multicast BGP/MPLS VPN Solution," Internet Engineering Task Force (IETF), Request for Comments: 6517, Feb. 2012, 41 pages.
U.S. Appl. No. 14/067,547 filed in the name of Jayant Kotalwar Oct. 30, 2013 and entitled "Network Device Configured to Generate Empty Route for Limiting Number of Withdrawal Messages."
U.S. Appl. No. 14/247,595 filed in the name of J. Kotalwar et al. Apr. 8, 2014 and entitled "Network Device with Service and Client Routing Elements Configured to Support Any-Source Multicast Extranets."

* cited by examiner

L = LEAF INFORMATION REQUIRED FLAG

CONTROLLED SWITCHING OF MULTICAST TRAFFIC BETWEEN SELECTIVE AND INCLUSIVE ROUTES BASED ON NUMBER OF MULTICAST RECEIVERS

PRIORITY CLAIM

The present application is a continuation-in-part of U.S. patent application Ser. No. 14/454,271, filed Aug. 7, 2014 and entitled "Network Device Configured to Track Multicast Receivers," which is commonly assigned herewith and incorporated by reference herein.

FIELD

The field relates generally to communication networks, and more particularly to communication protocols implemented using network devices of such networks.

BACKGROUND

Communication service providers often implement Virtual Private Networks (VPNs) for their customers. For example, VPNs may be provided using Internet Protocol (IP), Border Gateway Protocol (BGP) and Multiple Protocol Label Switching (MPLS) in accordance with the techniques disclosed in Internet Engineering Task Force (IETF) Request for Comments (RFC) 4364, entitled "BGP/MPLS IP Virtual Private Networks (VPNs)," which is incorporated by reference herein. The companion standard for VPNs in IPv6 networks is RFC 4659, entitled "BGP-MPLS IP Virtual Private Network (VPN) Extension for IPv6 VPN," which is also incorporated by reference herein. IP VPN services based on RFC 4364 and RFC 4659 have been deployed extensively by service providers around the world.

VPNs configured in accordance with RFC 4364 and RFC 4659 connect customer sites via tunnels, and allow IP unicast packets to travel from one customer site to another. However, these VPNs do not provide a way for IP multicast traffic to travel from one customer site to another.

The unicast VPN services defined in RFC 4364 and RFC 4659 can be extended to include the capability of handling IP multicast traffic, using the techniques disclosed in RFC 6513, entitled "Multicast in MPLS/BGP IP VPNs," which is incorporated by reference herein. VPNs configured in accordance with RFC 6513 are considered examples of what are more generally referred to herein as multicast VPNs (MVPNs). Such MVPNs are typically configured to support the transmission of IP multicast packets between customer sites using multicast tunnels.

SUMMARY

Conventional MVPN arrangements such as those defined by RFC 6513 can be problematic under certain circumstances. For example, these arrangements can be inefficient when an inclusive route has been originated by a multicast sender to allow multicast receivers to receive traffic for a multicast. In such an arrangement, all provider edge elements that are part of the inclusive route will receive the multicast traffic even if some of those provider edge elements have not actually joined the multicast by issuing a multicast join message. This is not only wasteful of network resources, but can also lead to difficulties when attempting to track multicast receivers.

Illustrative embodiments of the present invention overcome the above-noted problems associated with use of an inclusive route. Such embodiments advantageously provide explicit tracking of multicast receivers in MPLS/BGP IP VPNs as well in other communication network contexts. Moreover, such embodiments provide efficient techniques for switching multicast traffic between selective and inclusive tunnels of respective selective and inclusive routes responsive to multicast receiver tracking.

In one embodiment, a first network device adapted for communication with one or more other network devices is configured to determine a number of receivers of a multicast, and to control switching of traffic between selective and inclusive routes for the multicast based at least in part on the determined number of receivers.

By way of example, the first network device in some embodiments is configured to control switching of traffic between the selective and inclusive routes for the multicast by utilizing a selective route for the multicast responsive to a determination that traffic for the multicast is at or above a bandwidth threshold and the number of receivers is below an add threshold, and utilizing an inclusive route for the multicast responsive to a determination that traffic for the multicast is below the bandwidth threshold or the number of receivers is above a delete threshold.

The network devices in some embodiments may comprise respective routers or other provider elements associated with an IP-MPLS network, although it is to be appreciated that numerous other types of network devices and communication networks may be used in other embodiments.

DETAILED DESCRIPTION

Illustrative embodiments of the invention will be described herein with reference to exemplary communication networks, network devices and associated communication protocols. It should be understood, however, that the invention is not limited to use with the particular arrangements described, but is instead more generally applicable to any communication network application in which it is desirable to facilitate switching of multicast traffic between selective and inclusive routes.

Figure 1:
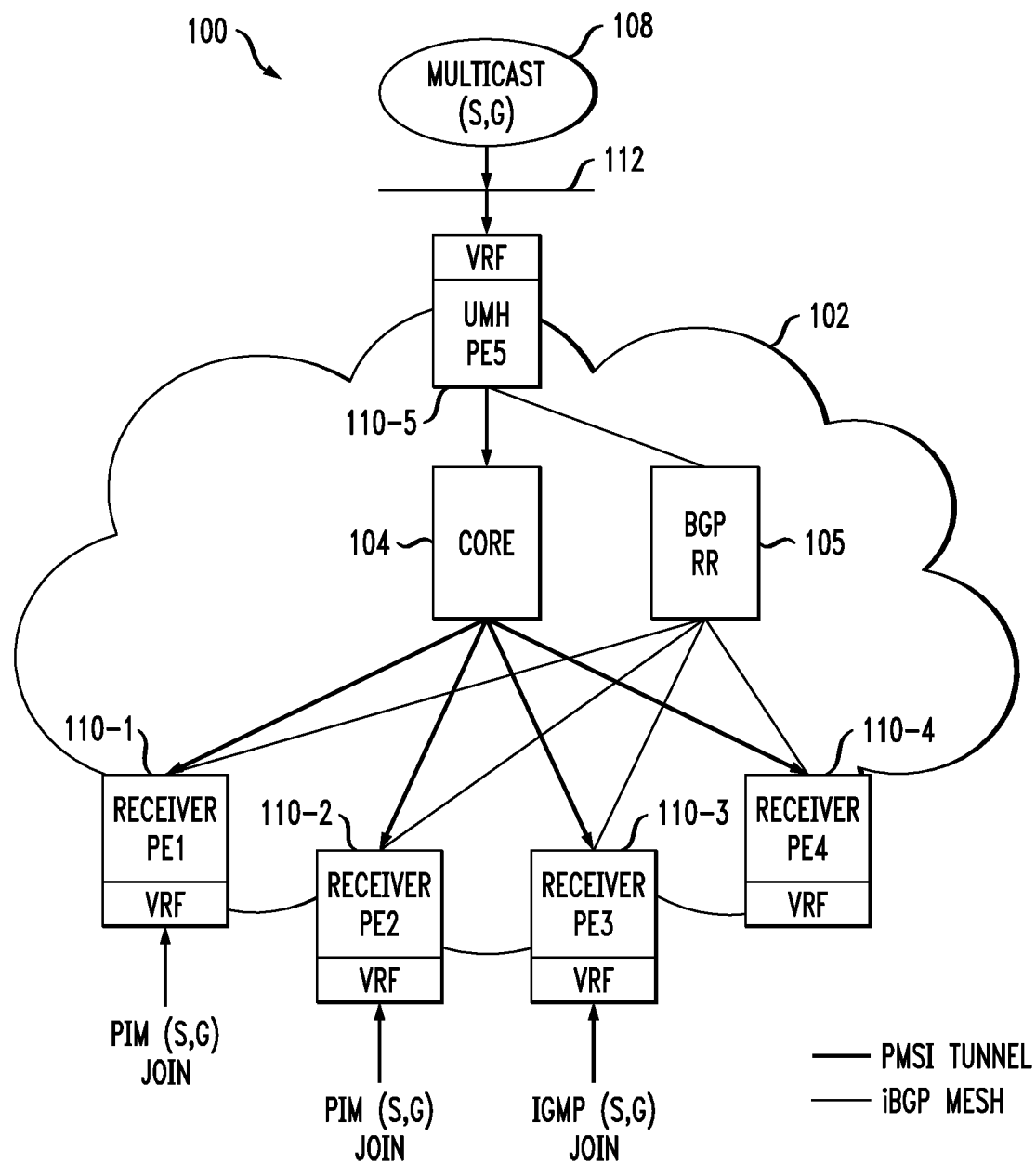
FIG. 1 shows a communication network that implements functionality for tracking multicast receivers and switching multicast traffic between selective and inclusive routes based at least in part on number of multicast receivers in an illustrative embodiment of the invention.

FIG. 1 shows a communication network 100 that includes an IP-MPLS network 102 having a core 104 and a BGP route reflector (RR) 105. The IP-MPLS network 102 includes a multicast source 108 and a plurality of provider edge (PE) elements including PE elements 110-1, 110-2, 110-3, 110-4 and 110-5, also denoted as PE1, PE2, PE3, PE4 and PE5, respectively. The PE element 110-5 is coupled between the multicast source 108 and the core 104, although it may be separated from the multicast source by additional network devices not explicitly illustrated in the figure, as represented by the horizontal line 112.

Each of the PE elements 110 represents a site of at least one MVPN and can be characterized as being one of a sender-receiver site, a sender site, and a receiver site. More particularly, in this embodiment, PE element 110-5 is assumed to be a sender site of an MVPN and PE elements 110-1 through 110-4 are assumed to be respective receiver sites of that MVPN.

It is to be appreciated that this particular arrangement of site type designations is exemplary only, and further that the site type of a given PE element of the communication network 100 can change over time. Moreover, other embodiments may utilize additional or alternative sets of site types. Additional details regarding site types can be found in the above-cited RFC 6513.

Sender and receiver sites of an MVPN are examples of what are more generally referred to herein as a multicast sender and a multicast receiver, respectively.

A PE element closest to the source of a given MVPN is referred to as a root PE element of that MVPN. In the present embodiment, the root PE element of the MVPN is the PE element 110-5. As noted above, such a PE element may be connected directly to the source or connected via one or more network devices of one or more networks. A given tunnel carrying multicast traffic for the MVPN would originate at the root PE element.

A PE element that comprises or is associated with a receiver site of the given MVPN is referred to as a leaf PE element of that MVPN. A given tunnel carrying multicast traffic for the MVPN would terminate at a leaf PE element. The PE elements 110-1 through 110-4 are considered to be examples of leaf PE elements in the present embodiment.

Multicast tunnels established for a given MVPN make efficient use of network links by avoiding traffic replication to individual receiver sites. These tunnels are unidirectional with respect to multicast traffic. In accordance with RFC 6513, each site is generally required to establish connectivity via tunnels to respective peer sites. By way of example, tunnels that would ordinarily be established between PE pairs in accordance with RFC 6513 include P-tunnels of a Provider Multicast Service Interface (PMSI), which may comprise an Inclusive PMSI (I-PMSI) tunnel or a Selective PMSI (S-PMSI) tunnel. Such tunnels are used to build a multicast tree comprising the above-noted sender and receiver PE elements as respective root and leaf PEs of the multicast tree.

BGP routes and associated tunnel attributes can be advertised or otherwise transmitted by the given PE element to all other PE elements in the form of an I-PMSI or S-PMSI auto-discovery (A-D) route that includes a tunnel attribute identifying the I-PMSI or S-PMSI tunnel. Details regarding conventional aspects of BGP and A-D routes in the context of MVPNs are disclosed in RFC 6514, entitled "BGP Encodings and Procedures for Multicast in MPLS/BGP IP VPNs," which is incorporated by reference herein.

As indicated in FIG. 1, each of the PE elements 110 maintains a Virtual Routing and Forwarding (VRF) table. A given such table contains information characterizing routes between the corresponding PE element and other PE elements that are associated with a given MVPN. The VRF tables in the FIG. 1 embodiment may be viewed as examples of what are more generally referred to herein as "routing tables." A VRF table or other routing table of a given PE element may be considered part of a routing information base (RIB) of that PE element.

The VRF tables of the respective receiver PE elements 110 are utilized in processing multicast join messages, which in the present embodiment include (S, G) join messages each configured to originate a route to a source S of a multicast group G. These messages may be configured as Protocol Independent Multicast (PIM) messages or Internet Group Management Protocol (IGMP) messages, or combinations thereof as indicated in the figure, although other protocols could also be used.

The (S, G) join messages as shown in FIG. 1 are also commonly referred to as "source joins." Other types of join messages can be used, such as (*, G) join messages, also commonly referred to as "shared joins."

Although the multicast in FIG. 1 is illustratively an (S, G) multicast, multicast receiver tracking and related multicast traffic switching techniques disclosed herein are applicable to wide variety of other types of multicasts, including a (*, G) multicast, a (S, *) multicast and a (*, *) multicast, where * is a wildcard denoting an unspecified multicast source or multicast group. These latter three multicast types can more particularly include respective (C-*, C-G), (C-S, C-*) and (C-*, C-*) types of wildcard multicasts, where C-S and C-G denote respective multicast source and group addresses in customer space. For additional details, see RFC 6625, "Wildcards in Multicast VPN Auto-Discovery Routes," which is incorporated by reference herein.

The sender PE element 110-5 is also denoted in the present embodiment as an upstream multicast hop (UMH) node relative to the receiver PE elements 110-1 through 110-4. The receiver PE elements 110-1 through 110-3 receive respective PIM or IGMP join messages as indicated in the figure and originate corresponding join messages in order to establish routes to the multicast source 108 via the sender PE element 110-5. The BGP RR 105 receives the join messages from the receiver PE elements 110-1 through 110-3 and reflects them to the UMH sender PE element 110-5. These communications occur over an internal BGP (iBGP) mesh indicated as relatively thin interconnection lines in the figure. The BGP RR 105 serves as a peer for each of the PE elements 110, thereby avoiding the need for each of the PE elements to peer with each of the other PE elements in a full mesh arrangement. In this peering context, the BGP RR is also referred to as a route reflector server and the PE elements are referred to as respective route reflector clients.

The UMH sender PE element 110-5 updates its VRF table based on the join messages and sends multicast traffic received from the multicast source 108 to the receiver PE elements 110-1 through 110-4 via the multicast tree. The associated tunnels for the multicast traffic are shown in the figure as relatively thick interconnection lines illustratively denoted as PMSI tunnels.

It should be understood, however, that MVPNs herein are not limited to those configured in accordance with RFC 6513 or RFC 6514, and a wide variety of other MVPN arrangements can be used in embodiments of the invention.

The PE elements and multicast sources may be considered examples of respective nodes of the network 100. Numerous other types and arrangements of nodes may be used in other embodiments. Thus, for example, other types of provider elements may be used that are not necessarily PE elements. The term "node" as used herein is intended to be broadly construed, and accordingly may comprise, for example, an entire network device or one or more components of a network device.

The nodes of the communication network 100 may be fixed or mobile. Accordingly, various combinations of fixed and mobile nodes may be used in a given communication network, while other networks may comprise all fixed nodes or all mobile nodes. Each of the nodes in a given communication network may be configured in substantially the same manner, or different configurations may be used for different subsets of the nodes within a given network.

It is assumed for certain embodiments disclosed herein that each such node corresponds to a separate network device. The network devices may comprise routers, switches, computers or other processing devices, in any combination. A given network device will generally comprise a processor and a memory coupled to the processor, as well as one or more transceivers or other types of network interface circuitry which allow the network device to communicate with the other network devices. The PE elements 110 of the communication network 100 are therefore considered examples of what are more generally referred to herein as "network devices."

As mentioned previously, conventional MVPN arrangements such as those defined by RFC 6513 and RFC 6514 are problematic in that they fail to provide adequate techniques for multicast receiver tracking.

For example, in the context of the FIG. 1 embodiment, assume that provider element PE5 is sending multicast traffic for the (S, G) multicast on an I-PMSI tunnel. This multicast traffic is received by all of the other PEs that have joined that I-PMSI tunnel, illustratively PE1 through PE4. However, as indicated in FIG. 1, PE4 does not originate a join message for the (S, G) multicast. Therefore, PE4 receives multicast traffic despite having not originated a join message for the (S, G) multicast, leading to inefficient use of network resources and degraded network performance.

This problem is addressed in one or more embodiments of the present invention by, for example, configuring a network device to originate a separate route, illustratively an S-PMSI A-D route, for facilitating the tracking of multicast receivers and not for carrying multicast traffic. Such an arrangement helps to avoid the sending of multicast traffic to network devices that have not originated join messages for the corresponding multicast, thereby conserving network resources and improving network performance. For example, such an arrangement allows the multicast sender to accurately and efficiently determine the multicast receivers, and then if necessary to switch multicast traffic to a selective tunnel involving only those multicast receivers.

The multicast receiver tracking and related multicast traffic switching functionality of communication network 100 will now be described in greater detail with reference to FIGS. 2 through 5. More detailed examples of such switching will then be described below in conjunction with FIGS. 6 through 8.

Figure 2:
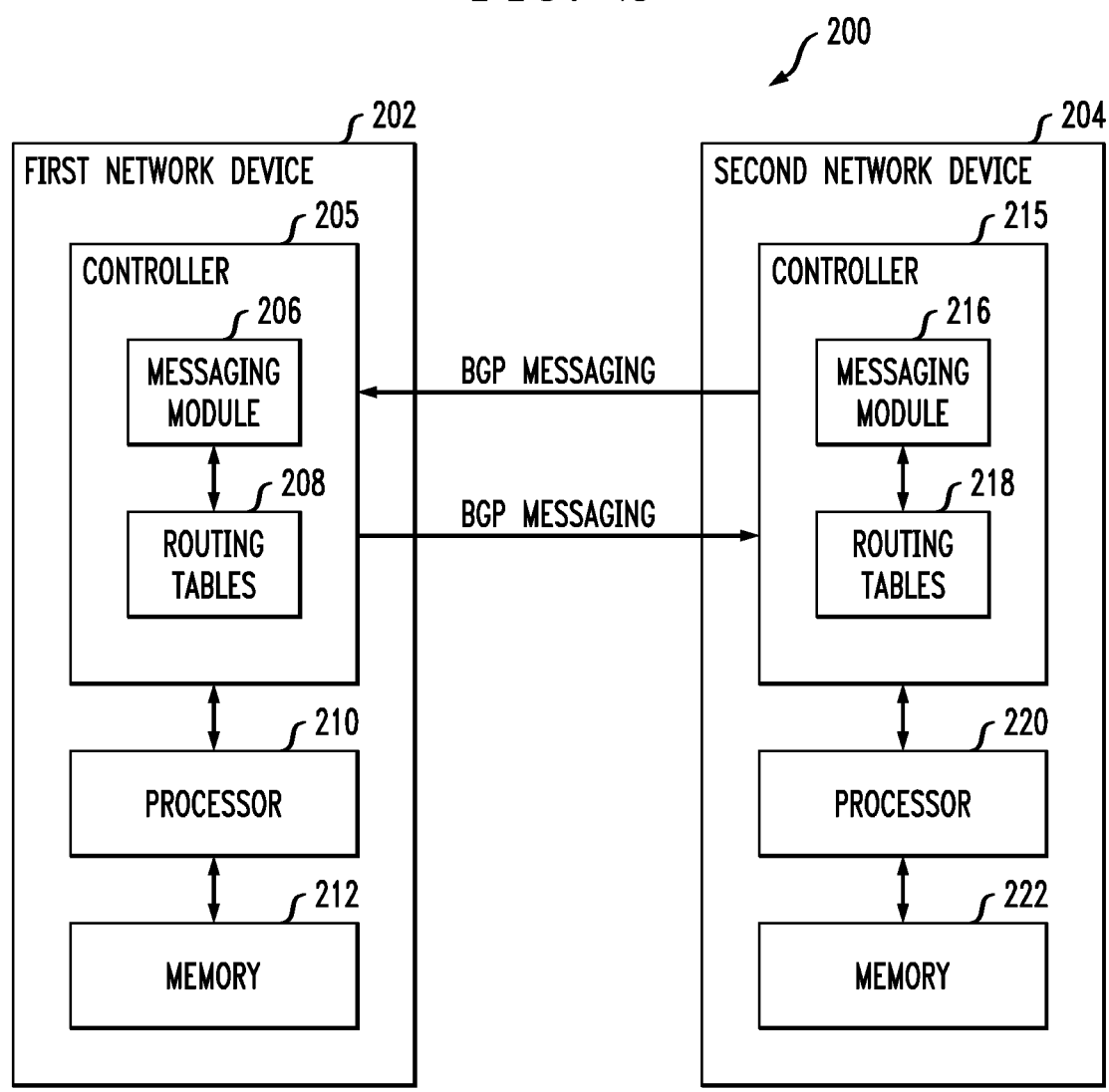
FIG. 2 is a more detailed view of first and second network devices in one possible implementation of the FIG. 1 network.

Referring initially to FIG. 2, a portion 200 of the network 100 includes first and second network devices 202 and 204. It is assumed that the first network device 202 corresponds to a multicast sender such as PE5 and that the second network device 202 corresponds to one of the multicast receivers PE1 through PE3, although other configurations are possible. For example, a given network device can operate as a multicast sender with respect to one multicast and as a multicast receiver with respect to another multicast. Accordingly, a given network device as that term is broadly used herein may comprise both multicast sender and multicast receiver functionality.

In the FIG. 2 embodiment, the first network device 202 is adapted for communication with the second network device 204, and vice versa. The first network device 202 comprises a controller 205 that includes a messaging module 206 coupled to routing tables 208. The first network device 202 further comprises a processor 210 coupled to the controller 205 and to a memory 212. The second network device 204 comprises a controller 215 that includes a messaging module 216 coupled to routing tables 218. The second network device 204 further comprises a processor 220 coupled to the controller 215 and to a memory 222.

Also in the FIG. 2 embodiment, BGP messages are exchanged between the controllers 205 and 215 utilizing the messaging modules 206 and 216. These elements are assumed to implement MVPN functionality similar to that described in the above-cited RFC 6513 and 6514, but suitably modified to support functionality for tracking of multicast receivers and switching of multicast traffic as disclosed herein.

Although network devices 202 and 204 are shown adjacent to one another in the figure, this is for simplicity and clarity of illustration only, and these network devices may of course communicate with one through one or more additional network devices that are not explicitly shown. For example, network devices 202 and 204 may illustratively correspond to respective PE elements PE5 and PE1 of FIG. 1, which communicate with one another via other network devices including one or more network devices associated with each of core 104 and BGP RR 105.

It is also to be appreciated that the particular arrangement of network device components shown in FIG. 2 is exemplary only, and numerous alternative network device configurations may be used in other embodiments. For example, the network devices can be configured to incorporate support for numerous other types of messaging in accordance with other communication protocols.

Figure 3:
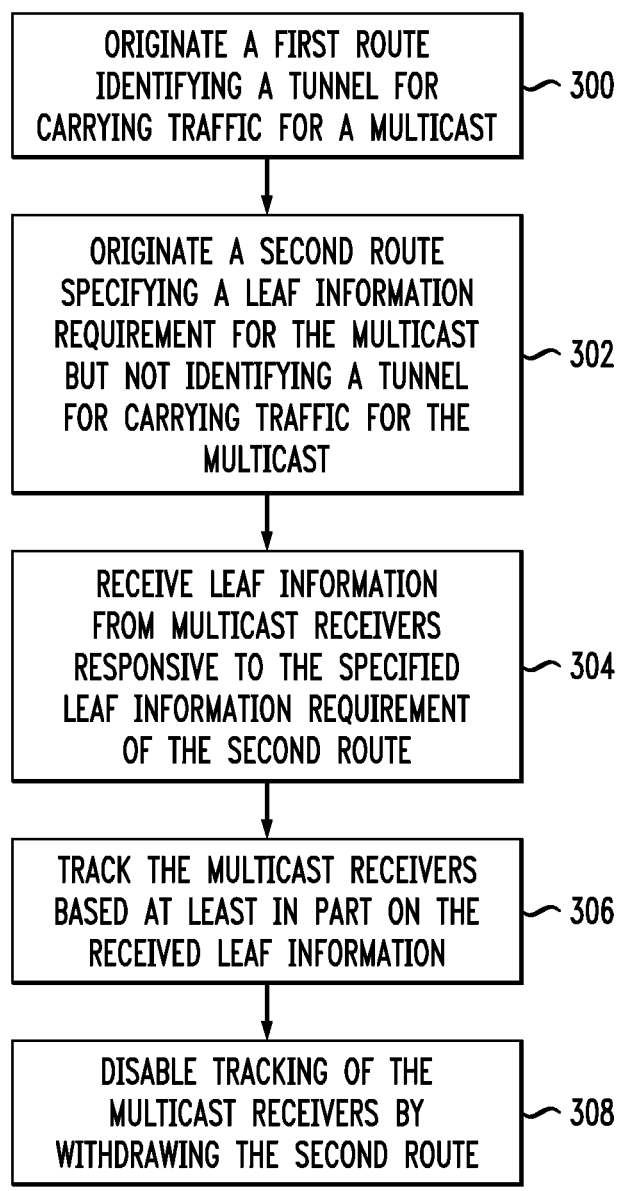
FIG. 3 is a flow diagram of an exemplary process carried out by one of the network devices of FIG. 2 operating as a multicast sender.
Figure 4:
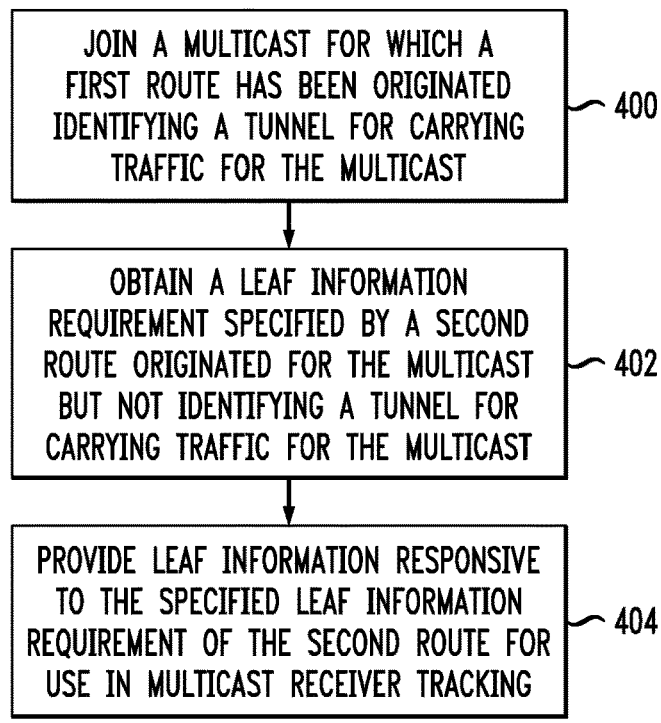
FIG. 4 is a flow diagram of an exemplary process carried out by one of the network devices of FIG. 2 operating as a multicast receiver.

Exemplary processes associated with multicast receiver tracking involving first and second network devices 202 and 204 will now be described with reference to FIGS. 3 and 4. More particularly, the process of FIG. 3 is assumed to be carried out by the first network device 202 operating as a multicast sender such as PE5, and the process of FIG. 4 is assumed to be carried out by the second network device 204 operating as a multicast receiver such as PE1 through PE3. As noted above, it is assumed that PE4 does not wish to join the multicast.

Referring now to FIG. 3, the process as illustrated includes steps 300 through 308 that are performed by the first network device 202 utilizing its controller 205 and associated messaging module 206 and routing tables 208.

In step 300, the first network device 202 originates a first route identifying a tunnel for carrying traffic for a multicast.

The first route illustratively comprises an inclusive route having a tunnel attribute that identifies an inclusive tunnel for the multicast. For example, the first route may comprise an I-PMSI A-D route having a tunnel attribute that identifies an I-PMSI tunnel. Other types of tunnels can be used in other embodiments.

In step 302, the first network device 202 originates a second route specifying a leaf information requirement for the multicast but not identifying a tunnel for carrying traffic for the multicast.

The second route illustratively comprises a selective route having a tunnel attribute configured to indicate that it carries no tunnel information. For example, the second route may comprise an S-PMSI A-D route having a tunnel attribute that does not identify an S-PMSI tunnel. The tunnel attribute of the selective route may be configured to indicate that it carries no tunnel information by setting a tunnel type field of the tunnel attribute to a predetermined value.

The specified leaf information requirement of the second route is illustratively established by setting a leaf information field of the tunnel attribute of the second route to a predetermined value. More particularly, the leaf information field of the tunnel attribute of the second route may comprise a leaf information required flag that is set to a logic one value by the first network device 202 to indicate the specified leaf information requirement.

Figure 5A:
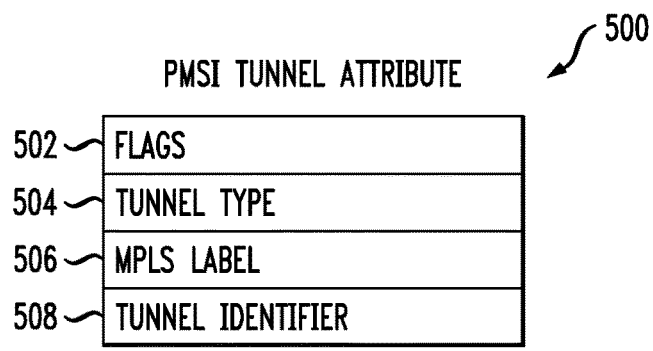
FIGS. 5A and 5B illustrate exemplary respective tunnel attribute and flag field formats utilized in conjunction with the processes of FIGS. 3 and 4.

An exemplary format for a PMSI tunnel attribute 500 is shown in FIG. 5A. This tunnel attribute format can be used for both I-PMSI A-D routes and S-PMSI A-D routes. The PMSI tunnel attribute 500 in this exemplary format comprises a flags field 502, a tunnel type field 504, an MPLS label field 506 and a tunnel identifier field 508.

Figure 5B:
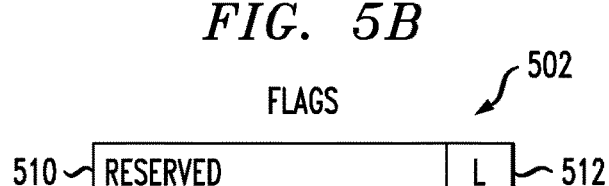

FIG. 5B shows the format of the flags field 502 in more detail. In this exemplary format, the flags field 502 comprises a plurality of reserved flags 510 and an L flag 512. The L flag 512 is the above-noted leaf information required flag, and is a single-bit flag indicating whether or not leaf information is required for the corresponding PMSI tunnel.

It is to be appreciated that the particular formats shown in FIGS. 5A and 5B are examples only, and other tunnel attribute formats can be used in other embodiments.

Referring again to FIG. 3, in step 304, the first network device 202 receives leaf information from a plurality of multicast receivers responsive to the specified leaf information requirement of the second route. The second network device 204 is assumed to be one of the multicast receivers.

The leaf information received from a given one of the multicast receivers responsive to the specified leaf information requirement of the second route illustratively comprises information associated with a leaf A-D route originated by the given multicast receiver responsive to the specified leaf information requirement.

Moreover, responsive to the specified leaf information requirement, the given multicast receiver does not establish a forwarding path to the second route.

In step 306, the first network device 202 tracks a plurality of receivers of the multicast based at least in part on the leaf information received from the multicast receivers responsive to the specified leaf information requirement of the second route.

The multicast receivers tracked by the first network device 202 illustratively comprise respective PE elements that have joined the multicast by issuing a multicast join message, such as PE elements PE1, PE2 and PE3 of FIG. 1. Other PE elements such as PE4 that have not issued multicast join messages do not send leaf information responsive to the specified leaf information requirement of the second route, and therefore are not tracked as multicast receivers by the first network device 202.

Such an arrangement allows the multicast sender to identify and track the appropriate multicast receivers, thereby avoiding problematic situations in which multicast traffic is sent to PE elements that do not join the multicast. For example, the multicast sender is able to identify and track the multicast receivers without switching the multicast traffic to a selective tunnel.

The multicast sender can utilize information relating to the tracked multicast receivers in order to determine whether or not to switch the multicast traffic from an inclusive tunnel to a selective tunnel. For example, if there are 100 PE elements in the communication network and 99 of them are determined to be multicast receivers using steps 300 through 306 of the FIG. 3 process, it will likely be more efficient for the multicast sender to continue to send multicast traffic over the inclusive tunnel. However, if only a relatively small number of the 100 PE elements are determined to be multicast receivers, the multicast sender can switch the multicast traffic to a selective tunnel by re-originating the second route with the selective tunnel identified in its tunnel attribute.

In step 308, the first network device 202 disables tracking of the multicast receivers by withdrawing the second route.

As indicated above, it is possible in some embodiments to use the second route to convey tunnel information after at least one iteration of steps 300 through 306 of the FIG. 3 process. For example, the first network device 202 in some embodiments switches traffic for the multicast from the tunnel identified by the first route to a tunnel identified by the second route by updating the second route to identify a tunnel for carrying traffic for the multicast. In such an arrangement, the first network device 202 may then subsequently switch traffic for the multicast from the tunnel identified by the second route back to the tunnel identified by the first route by again updating the second route, this time such that the second route no longer identifies a tunnel for carrying traffic for the multicast.

Referring now to FIG. 4, the process as illustrated includes steps 400 through 404 that are performed by the second network device 204 utilizing its controller 215 and associated messaging module 216 and routing tables 218.

In step 400, the second network device 204 joins a multicast for which a first route has been originated identifying a tunnel for carrying traffic for the multicast. This is the multicast for which the first route is originated by the first network device 202 in step 300 of FIG. 3.

In step 402, the second network device 204 obtains a leaf information requirement specified by a second route originated for the multicast but not identifying a tunnel for carrying traffic for the multicast. This is the second route originated by the first network device 202 in step 302 of FIG. 3.

In step 404, the second network device 204 provides leaf information responsive to the specified leaf information requirement of the second route for use in multicast receiver tracking. As noted above, this illustratively involves originating a leaf A-D route responsive to the specified leaf information requirement. Also, the leaf information is provided without establishing a forwarding path to the second route.

The leaf information provided by the second network device 204 and the other multicast receivers collectively comprises the leaf information received by the first network device 202 in step 304 of FIG. 3.

The second network device 204 may subsequently receive a prune message relating to the multicast, and withdraw the leaf A-D route responsive to the prune message.

Also, the second network device 204 can switch between tunnels for the multicast based on updates to the second route made by the first network device 202. For example, the second network device can switch from the tunnel identified by the first route to a tunnel identified by the second route responsive to updating of the second route to identify a tunnel for carrying traffic for the multicast.

In such an arrangement, the second network device 204 can subsequently switch from the tunnel identified by the second route back to the tunnel identified by the first route responsive to further updating of the second route by the first network device 202 such that the second route no longer identifies a tunnel for carrying traffic for the multicast.

In the embodiments of FIGS. 3 and 4, use of the second route to specify a leaf information requirement allows the multicast sender to determine the multicast receivers in a particularly accurate and efficient manner. This advantageously allows the multicast sender to determine whether or not to switch multicast traffic from an inclusive tunnel to a selective tunnel. For example, responsive to a determination that PE1, PE2 and PE3 are the actual multicast receivers in the FIG. 1 embodiment, PE5 can switch the multicast traffic from an inclusive tunnel for which PE4 receives the multicast traffic to a selective tunnel for which PE4 will not receive the multicast traffic. This conserves network resources and enhances network performance.

The particular process steps and other operations described above in conjunction with the flow diagrams of FIGS. 3 and 4 are exemplary only, and additional or alternative process steps or operations may be used in other embodiments. For example, certain steps shown serially in the figures can in some situations be performed at least in part in parallel with one another. Moreover, although the steps of the FIG. 3 process are described as being performed by first network device 202 and the steps of the FIG. 4 process are described as being performed by the second network device 204, this is by way of illustrative example, and these processes or portions thereof can each be performed by other network devices. Also, it is possible that a given one of the processes can be performed in part by one network device and in part by another network device.

One possible application of the exemplary processes of FIGS. 3 and 4 will now be described with reference to the PE elements 110-1 through 110-5 of FIG. 1. As noted previously, in this example, PE5 is assumed to be a multicast sender and PE1 through PE3 are assumed to be respective multicast receivers. It is also assumed in the context of this example that PE4 does not wish to join the multicast, as indicated by its lack of an associated multicast join message in FIG. 1. Finally, it is assumed that the multicast sender PE5 originates an I-PMSI A-D route that identifies an I-PMSI tunnel for carrying traffic for the (S, G) multicast.

In order to track the multicast receivers for the (S, G) multicast, PE5 also originates an S-PMSI A-D route having a tunnel attribute with its leaf information required flag set to a logic one value and its tunnel type field set to indicate that it carries no tunnel information. Accordingly, this S-PMSI A-D route does not identify an S-PMSI tunnel for carrying traffic for the multicast.

Responsive to the leaf information required flag, the multicast receivers PE1, PE2 and PE3 will each originate a leaf A-D route but will not set up a forwarding path to the S-PMSI A-D route. However, PE4 will not originate a leaf A-D route. This allows PE5 to identify and track the multicast receivers PE1, PE2 and PE3. As noted above, PE5 can switch the multicast traffic from an inclusive tunnel for which PE4 receives the multicast traffic to a selective tunnel for which PE4 will not receive the multicast traffic, thereby avoiding the transmission of multicast traffic to PE4.

If any of the multicast receivers PE1, PE2 or PE3 later receives a prune message for the (S, G) multicast, that PE element will withdraw the leaf A-D route that it previously originated. This allows PE5 to continue to accurately track the current set of multicast receivers as receivers leave the multicast. PE5 can then adjust the tunnel type as appropriate based on the remaining multicast receivers.

If PE5 decides to switch the multicast traffic from the I-PMSI tunnel to an S-PMSI tunnel, it updates the S-PMSI A-D route such that its tunnel attribute identifies the S-PMSI tunnel, and then re-originates the updated S-PMSI A-D route.

The multicast receivers will see the updated S-PMSI tunnel attribute and will set up their forwarding paths for the multicast to receive traffic from the tunnel advertised in the updated S-PMSI A-D route. Tracking may then subsequently be disabled in this scenario by re-originating the S-PMSI A-D route with the leaf information required flag being reset to a logic zero value but with all other information unchanged. However, for certain protocols in which tunnels are built from root to leaf, such as RSVP, tracking would generally not be disabled in this scenario.

If PE5 subsequently decides to switch traffic back to the I-PMSI tunnel, it updates the S-PMSI A-D route to set the tunnel type to again indicate that it carries no tunnel information. The multicast receivers will then set up their forwarding paths for the multicast to receive traffic from the I-PMSI tunnel.

The above-described operations associated with application of the processes of FIGS. 3 and 4 to the PE elements 110 of FIG. 1 are presented by way of illustrative example only, and other operations may be used to implement these or similar processes in other embodiments.

Referring again to FIG. 2, the network devices 202 and 204 implementing the respective processes of FIGS. 3 and 4 comprise respective processors 210 and 220 and respective memories 212 and 222. The processor 210 or 220 of such a network device may be implemented utilizing a microprocessor, a microcontroller, an application-specific integrated circuit (ASIC), a field-programmable gate array (FPGA), or other type of processing circuitry, as well as portions or combinations of such processing circuitry. The processor may include one or more embedded memories as internal memories.

The processor 210 or 220 and any associated internal or external memory may be used in storage and execution of one or more software programs for controlling the operation of the corresponding network device 202 or 204. Accordingly, one or more of the modules 206 and 208 of controller 205 in network device 202, one or more of the modules 216 and 218 of controller 215 in network device 204, or portions of these modules, may be implemented at least in part using such software programs.

Each of the memories 212 and 222 of the network devices 202 and 204 is assumed to include one or more storage areas that may be utilized for program code storage. The memory 212 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Articles of manufacture comprising such computer program products or other processor-readable storage media are considered embodiments of the invention.

The memory 212 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The processor, memory, controller and other components of a given network device of communication network 100 may include well-known circuitry suitably modified to implement at least a portion of the multicast receiver tracking and related multicast traffic switching functionality described above. Conventional aspects of such circuitry are well known to those skilled in the art and therefore will not be described in detail herein.

It is to be appreciated that the particular arrangement of network device components shown in FIG. 2 is exemplary only, and numerous alternative network device configurations may be used in other embodiments. For example, the network devices can be configured to incorporate additional or alternative components and to support other communication protocols.

An exemplary process for switching multicast traffic between selective and inclusive routes will now be described with reference to FIG. 6. This switching process utilizes the multicast receiver tracking techniques previously described in conjunction with FIGS. 3 and 4, although other techniques for determining the number of multicast receivers can be used in other embodiments.

Figure 6:
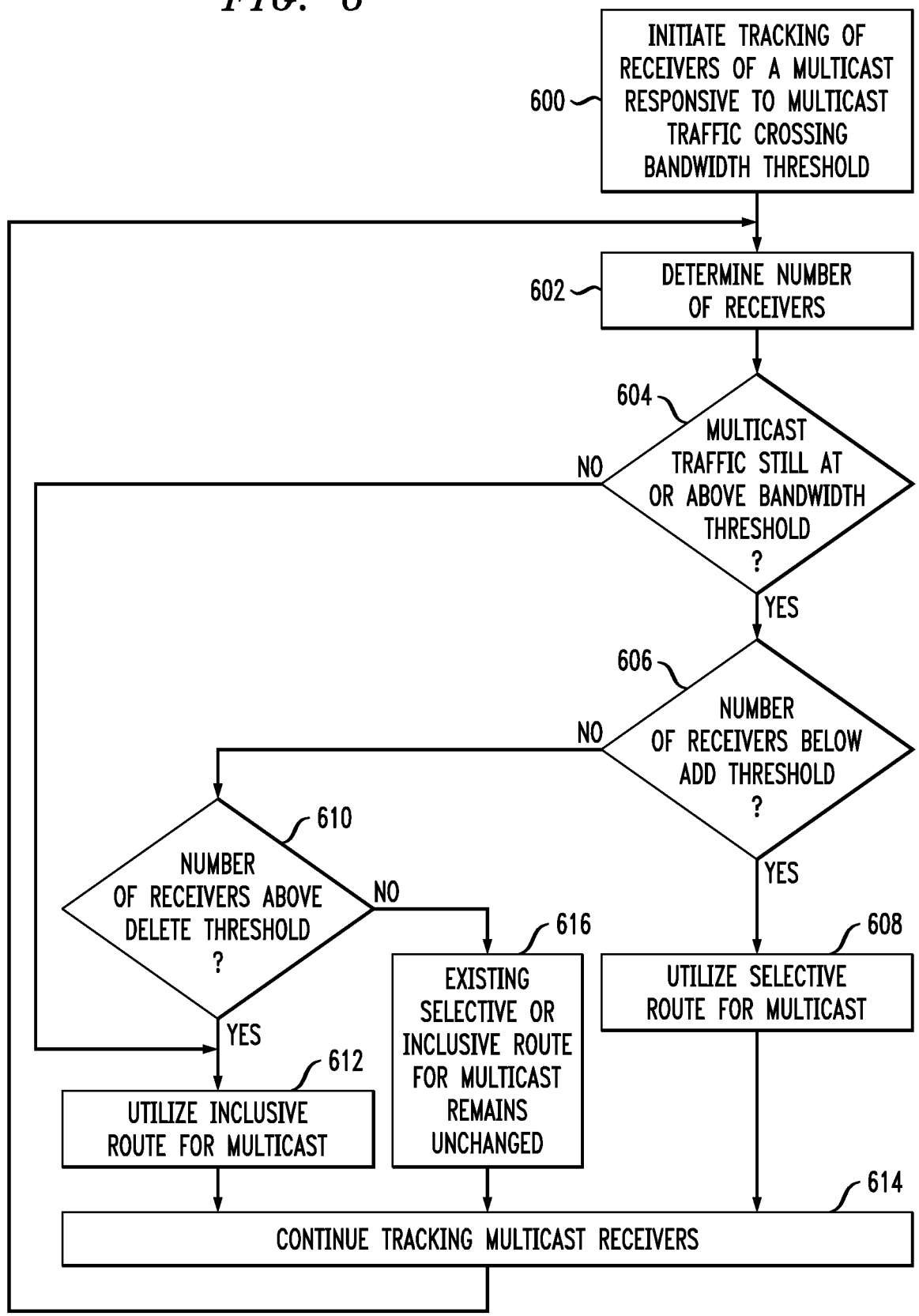
FIG. 6 is flow diagram of another exemplary process carried out by one of the network devices of FIG. 3 operating as a multicast sender.

The process of FIG. 6 is assumed to be carried out by the first network device 202 operating as a multicast sender such as PE5. The process as illustrated includes steps 600 through 616 that are performed by the first network device 202 utilizing its controller 205 and associated messaging module 206 and routing tables 208.

In step 600, the first network device 202 initiates tracking of multicast receivers responsive to multicast traffic crossing a specified bandwidth threshold. The bandwidth threshold illustratively comprises an otherwise conventional bandwidth threshold utilized to trigger creation of an S-PMSI, such as a bandwidth threshold specifying a particular data rate or flow rate for multicast traffic, although other types of bandwidth thresholds can be used in other embodiments.

Here, "crossing" of the bandwidth threshold is assumed to refer to the multicast traffic reaching or exceeding the threshold, or in other words, being at or above the threshold. For such a threshold and other thresholds referred to herein, the term "threshold" is intended to be broadly construed, and therefore language such as "at or above" or "below" a particular threshold should not be construed as unduly limiting. For example, those skilled in the art will appreciate that relatively small adjustments can be made to a given threshold value in order to modify a corresponding threshold-based condition from an "at or above" condition to an "above" condition, and similarly from a "below" condition to an "at or below" condition, without significantly altering the associated trigger functionality. Accordingly, use of terms such as "at or above" or "below" herein should be viewed as merely examples of threshold-based conditions, and other conditions can be used.

In step 602, the first network device 202 determines the number of receivers. As mentioned previously, the number of receivers can be determined accurately and efficiently utilizing leaf information obtained in the multicast receiver tracking process of FIG. 3. In conjunction with initiation of the multicast tracking in step 600, a discovery timer may be started, with an initial determination of the number of receivers being performed responsive to expiration of the discovery timer. The discovery timer is set to ensure that initiation of the multicast tracking has sufficient time to complete before an initial determination of the number of receivers is made. This discovery timer is utilized only for the initial determination of the number of receivers after initiation of the multicast tracking is complete, and once the multicast tracking is in place at expiration of the discovery timer the number of receivers can be determined on a substantially continuous basis and appropriate switching of traffic between selective and inclusive routes provided subject to add and delete thresholds to be described below. Again, it is possible to utilize a variety of other types of techniques to determine the number of multicast receivers in other embodiments.

In step 604, the first network device 202 again verifies that the multicast traffic is at or above the bandwidth threshold. Checking of the multicast traffic against the bandwidth threshold is illustratively controlled responsive to a data delay timer, although other techniques can be used. If the traffic is still at or above the bandwidth threshold, the first network device 202 in step 606 determines if the number of receivers from step 602 is below an add threshold, and if the number of receivers is below the add threshold, a selective route is utilized for the multicast as indicated in step 608. The "add threshold" illustratively denotes a threshold number of receivers below which a selective route will be used to carry multicast traffic to those receivers.

If it is determined in step 606 that the number of receivers from step 602 is not below the add threshold, the first network device 202 in step 610 determines if the number of receivers is above a delete threshold, and if the number of receivers is above the delete threshold, an inclusive route is utilized for the multicast as indicated in step 612. The "delete threshold" illustratively denotes a threshold number of receivers above which an inclusive route will be used to carry multicast traffic to those receivers.

Upon completion of step 608 or step 612, the process moves to step 614 to continue tracking multicast receivers.

If it is determined in step 604 that the multicast traffic is no longer at or above the bandwidth threshold, the process moves directly to step 612 such that an inclusive route is utilized for the multicast without regard to the current determination of the number of receivers. For example, if a selective route was previously established and utilized based on a previous determination of the number of receivers, that selective route is torn down in step 612 and the traffic moves back to an inclusive route.

If it is determined in step 610 that the number of receivers is not above the delete threshold, the existing selective or inclusive route for the multicast remains unchanged, as indicated in step 616. The process then moves to step 614 to continue tracking multicast receivers.

From step 614, the process moves back to step 602 to again determine the number of receivers. The portion of the process from step 602 to step 614 is therefore repeated for multiple iterations, with each iteration determining the current number of multicast receivers and switching the multicast traffic between selective and inclusive routes as appropriate based on the current number of receivers and the bandwidth threshold. This portion of the process can in some embodiments run substantially continuously, such that any change in the number of tracked receivers is automatically evaluated relative to the add and delete thresholds in order to determine if switching of multicast traffic from a selective route to an inclusive route or from an inclusive route to a selective route is appropriate. Thus, after an initial determination of whether a selective or inclusive route should be utilized for the multicast, subsequent determinations regarding transitions between selective and inclusive routes are determined by continued tracking of the number of receivers. The bandwidth threshold is also taken into account in such determinations, as apparent from the placement of step 604 in the exemplary process.

It should be noted that the terminology "switching traffic between selective and inclusive routes" as used herein is intended to be broadly construed. For example, the selective and inclusive routes may comprise respective S-PMSI and I-PMSI routes, or respective S-PMSI and I-PMSI tunnels associated with such routes. Numerous alternative types of selective and inclusive routes may be used. Also, the switching may but need not involve originating or establishing the particular selective or inclusive route to which multicast traffic is being switched.

In the FIG. 6 embodiment, the first network device 202 is configured to control switching of traffic between the selective and inclusive routes for the multicast by utilizing a selective route for the multicast responsive to a determination that traffic for the multicast is at or above the bandwidth threshold in step 604 and the number of receivers is below the add threshold in step 606. Utilizing the selective route may comprise, for example, establishing the selective route responsive to the determination. The first network device 202 is further configured to control switching of traffic between the selective and inclusive routes for the multicast by utilizing an inclusive route for the multicast responsive to a determination that traffic for the multicast is below the bandwidth threshold in step 604 or the number of receivers is above the delete threshold in step 610. Utilizing the inclusive route may comprise, for example, tearing down a previously-established selective route and transitioning to the inclusive route responsive to the determination.

As a more particular example of one possible switching arrangement implemented over multiple iterations of the FIG. 6 process, the first network device 202 is illustratively configured to control switching of traffic between the selective and inclusive routes for the multicast by establishing a selective route based at least in part on the number of receivers determined in a first iteration of the process being below the add threshold. The first network device 202 subsequently tears down the selective route and transitions to an inclusive route based at least in part on the number of receivers determined in a second iteration of the process being above the delete threshold. The first network device 202 can then once again establish a selective route based at least in part on the number of receivers determined in a third iteration of the process being below the add threshold. Numerous other arrangements of switching between selective and inclusive routes over multiple iterations of the FIG. 6 process are possible. For example, as indicated previously, references to "below" the add threshold and "above" the delete threshold can in other embodiments be replaced with respective "at or above" and "at or below" conditions.

Figure 7:
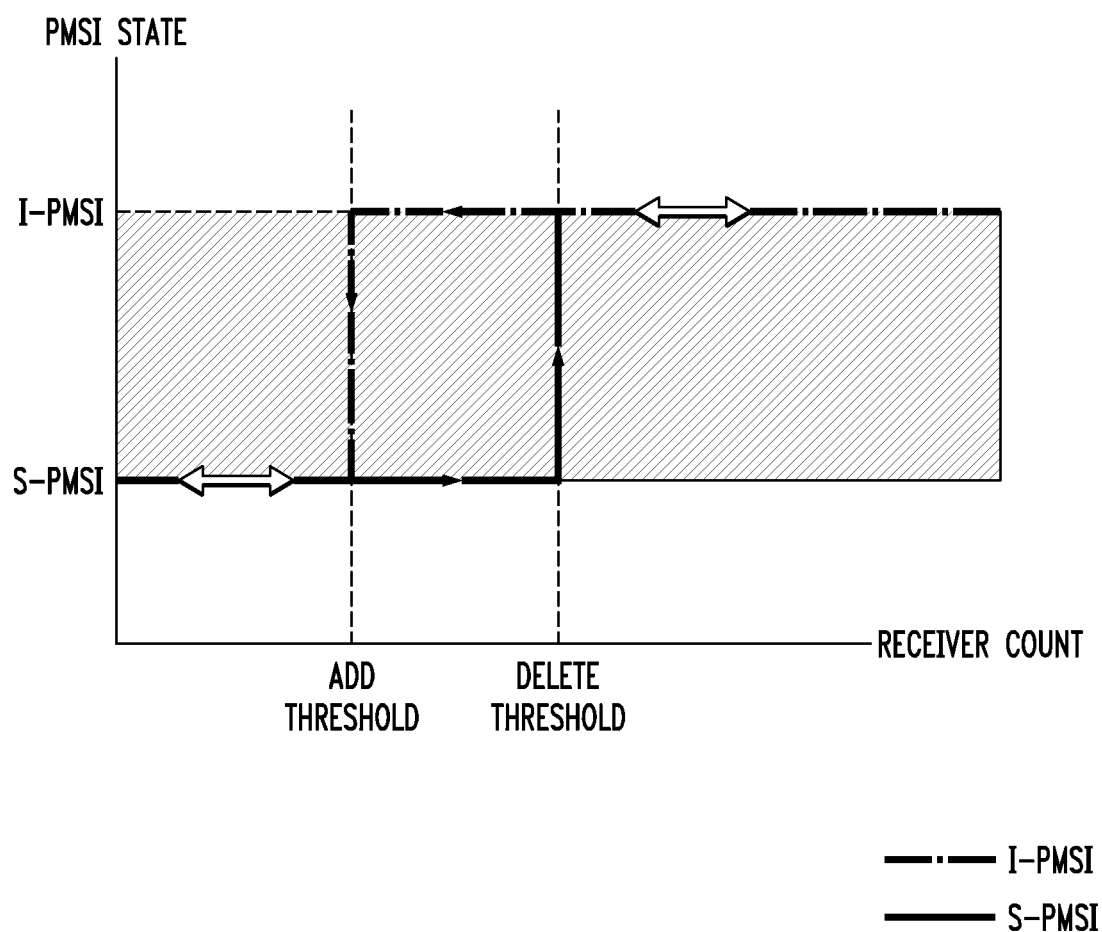
FIG. 7 illustrates switching of multicast traffic between selective and inclusive routes based at least in part on number of multicast receivers in one embodiment.

FIG. 7 shows another example of switching of multicast traffic between selective and inclusive routes based at least in part on number of multicast receivers in an illustrative embodiment. This figure shows PMSI state of the multicast as a function of receiver count, where receiver count denotes the current number of receivers as determined from the receiver tracking described previously.

It can be seen from the figure that in this embodiment the transition of the multicast PMSI state from an I-PMSI route to an S-PMSI route occurs in conjunction with the receiver count falling below an add threshold, and the transition of the multicast PMSI state from an S-PMSI route to an I-PMSI route occurs in conjunction with the receiver count rising above a delete threshold. The delete threshold specifies the number of receivers above which an inclusive route is utilized for the multicast. The delete threshold is greater than the add threshold which specifies the number of receivers below which a selective route is utilized for the multicast. More particularly, the delete threshold should be set significantly higher than the add threshold in order to avoid excessive creation and subsequent deletion of selective routes.

The values used for add and delete thresholds will typically vary depending upon the network implementation, and providing adjustability of such values in a given embodiment can provide customers with an ability to control the conditions under which selective routes are deployed for a particular multicast. For example, a customer can establish different add and delete thresholds for different types of IPTV channels. Additionally or alternatively, thresholds can be enabled or disabled during service. Given that the corresponding multicast tree creates state in the network, it is desirable to deploy a given selective route when there is an appropriate number of receivers present.

For simplicity and clarity of illustration, the embodiment illustrated in the diagram of FIG. 7 assumes that the multicast traffic is at or above the bandwidth threshold at all times, such that the switching is controlled based solely on the receiver count relative to the add and delete thresholds.

Embodiments such as those described in conjunction with FIGS. 6 and 7 advantageously provide a more accurate and efficient control mechanism for switching between selective and inclusive routes for a multicast. Such embodiments avoid inefficiencies associated with creation of selective routes based on bandwidth threshold alone without unduly limiting the number of selective routes per multicast. Moreover, network resources are conserved by avoiding excessive creation of selective routes and corresponding state information.

The particular process steps and other operations described above in conjunction with the flow diagram of FIG. 6 are also exemplary only, and additional or alternative process steps or operations may be used in other embodiments. For example, certain steps shown serially in the figures can in some situations be performed at least in part in parallel with one another. Also, the particular network device or network devices performing the process steps can be varied in other embodiments.

Figure 8:
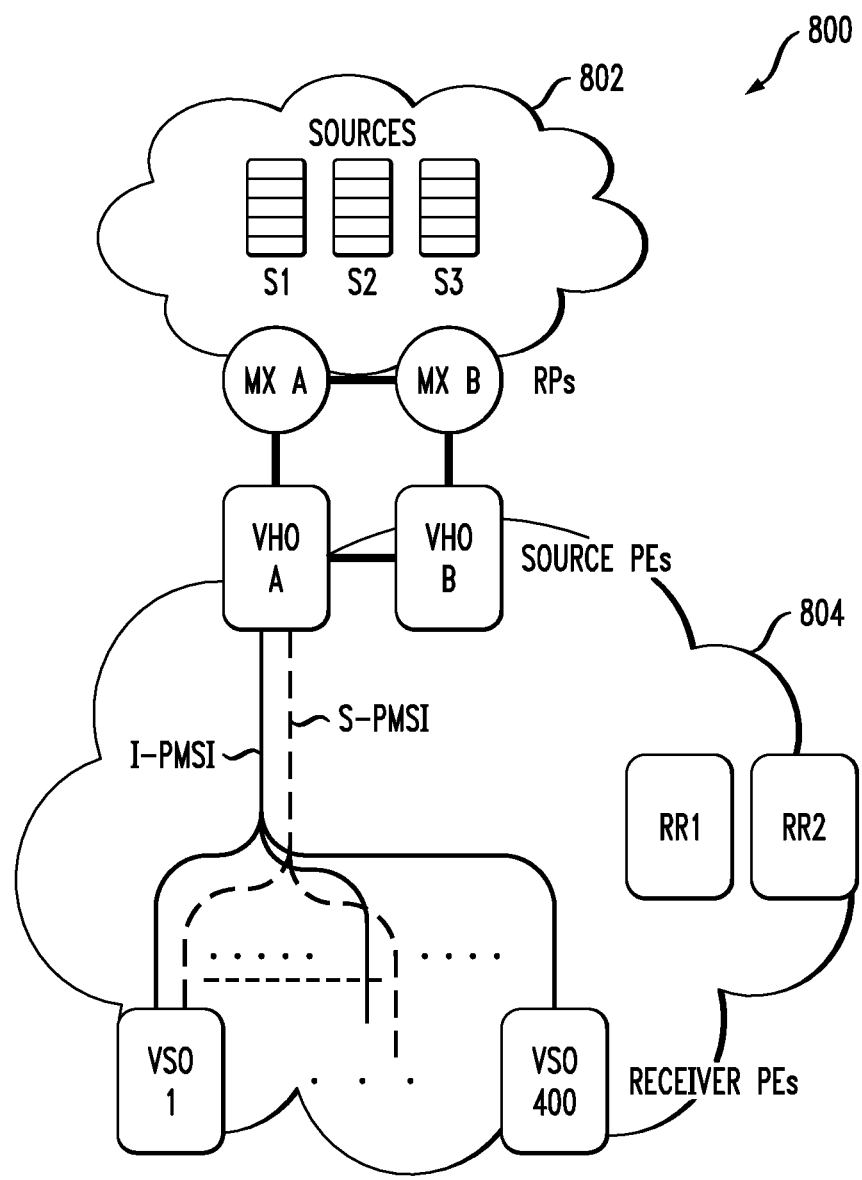
FIG. 8 shows another embodiment of a communication network that implements functionality for tracking multicast receivers and switching multicast traffic between selective and inclusive routes based at least in part on number of multicast receivers in an illustrative embodiment of the invention.

Another embodiment will now be described in conjunction with FIG. 8, which illustrates a communication network 800 that implements functionality for tracking multicast receivers and switching multicast traffic between selective and inclusive routes based at least in part on number of multicast receivers. The network 800 comprises a first portion 802 that includes a plurality of multicast sources denoted S1, S2 and S3 and a second portion 804 that includes PE elements including source PEs denoted VHO A and VHO B, and receiver PEs denoted VSO 1 through VSO 400, where VHO designates a video hub office and VSO denotes a video serving office.

The sources S1, S2 and S3 of the first portion 802 communicate with VHO A and VHO B of the second portion 804 via respective rendezvous points (RPs) comprising respective routers denoted MX A and MX B. Also included in the second portion 804 of network 800 are route reflectors denoted RR1 and RR2. Each of the multicast sources S1, S2 and S3 in this embodiment is assumed to be configured to stream a plurality of multicast channels to the VSOs via the VHOs.

Each of the VHOs in this embodiment is configured to track multicast receivers including subsets of the VSOs, utilizing the multicast receiver tracking techniques described in conjunction with FIGS. 3 and 4. In addition, each of the VHOs is configured to switch multicast traffic to subsets of the VSOs between S-PMSI and I-PMSI routes as illustrated for VHO A in the figure, utilizing multicast traffic switching techniques such as those described in conjunction with FIGS. 6 and 7.

The network devices in this embodiment are assumed to comprise respective routers, although other types of network devices may be used. As a more particular example, at least a subset of the VHOs and VSOs in this embodiment may comprise respective Service Routers (SRs) of a type commercially available from Alcatel-Lucent under Product Nos. 7750, although again other types and arrangements of routers, or more generally network devices, can be used in other embodiments.

The communication network 800, like the network 100 of FIG. 1, is presented by way of illustrative example only, and numerous alternative network configurations can be used in other embodiments.

As mentioned above, embodiments of the present invention may be implemented in the form of articles of manufacture each comprising one or more software programs that are executed by processing circuitry of a network device of a communication network.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

Although certain illustrative embodiments are described herein in the context of particular communication protocols such as IP, BGP and MPLS, other types of networks can be used in other embodiments. The term "network" as used herein is therefore intended to be broadly construed.

It should again be emphasized that the embodiments described above are for purposes of illustration only, and should not be interpreted as limiting in any way. Other embodiments may use different types of network, device and module configurations, and alternative communication protocols and process steps for implementing multicast receiver tracking and related multicast traffic switching functionality in a communication network. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. An apparatus comprising:
a first network device adapted for communication with one or more other network devices;
the first network device being configured:
to determine a number of receivers of a multicast; and
to control switching of traffic between selective and inclusive routes for the multicast based at least in part on a comparison of the determined number of receivers to at least one threshold number of receivers.

2. The apparatus of claim 1 wherein the first network device is configured to control switching of traffic between the selective and inclusive routes for the multicast by utilizing a selective route for the multicast responsive to a determination that:
(i) traffic for the multicast is at or above a bandwidth threshold; and
(ii) the number of receivers is below an add threshold.

3. The apparatus of claim 2 wherein utilizing the selective route comprises establishing the selective route responsive to the determination of (i) and (ii).

4. The apparatus of claim 1 wherein the first network device is configured to control switching of traffic between the selective and inclusive routes for the multicast by utilizing an inclusive route for the multicast responsive to a determination that:
(i) traffic for the multicast is below a bandwidth threshold; or
(ii) the number of receivers is above a delete threshold.

5. The apparatus of claim 4 wherein utilizing the inclusive route comprises tearing down a previously-established selective route and transitioning to the inclusive route responsive to the determination of (i) and (ii).

6. The apparatus of claim 4 wherein the delete threshold is greater than an add threshold specifying a number of receivers below which a selective route is utilized for the multicast if traffic for the multicast is at or above the bandwidth threshold.

7. The apparatus of claim 1 wherein the first network device is configured to control switching of traffic between the selective and inclusive routes for the multicast by establishing a selective route based at least in part on the number of receivers determined in a first iteration being below an add threshold, and subsequently tearing down the selective route and transitioning to an inclusive route based at least in part on the number of receivers determined in a second iteration being above a delete threshold.

8. The apparatus of claim 7 wherein the first network device is configured to control switching of traffic between the selective and inclusive routes for the multicast by again establishing a selective route based at least in part on the number of receivers determined in a third iteration being below the add threshold.

9. The apparatus of claim 1 wherein the first network device is configured to determine the number of receivers of the multicast by tracking receivers of the multicast based at least in part on leaf information received from the receivers responsive to a leaf information requirement established for the multicast.

10. The apparatus of claim 9 wherein the first network device is configured to establish the leaf information requirement for the multicast by originating a selective route that specifies the leaf information requirement but does not identify a tunnel for carrying traffic for the multicast.

11. The apparatus of claim 10 wherein the specified leaf information requirement of the selective route is established by setting a leaf information field of a tunnel attribute of the selective route to a predetermined value.

12. The apparatus of claim 11 wherein the leaf information field of the tunnel attribute of the selective route comprises a leaf information required flag that is set to a predetermined logic value to indicate the specified leaf information requirement.

13. The apparatus of claim 1 wherein the selective and inclusive routes comprise respective Selective Provider Multicast Service Interface (S-PMSI) and Inclusive Provider Multicast Service Interface (I-PMSI) routes.

14. A communication network comprising the apparatus of claim 1.

15. A method comprising:
    determining a number of receivers of a multicast; and
    controlling switching of traffic between selective and inclusive routes for the multicast based at least in part on a comparison of the determined number of receivers to at least one threshold number of receivers;
    wherein the determining and controlling are performed by a network device.

16. The method of claim 15 wherein controlling switching of traffic between selective and inclusive routes for the multicast comprises utilizing a selective route for the multicast responsive to a determination that:
    (i) traffic for the multicast is at or above a bandwidth threshold; and
    (ii) the number of receivers is below an add threshold.

17. The method of claim 15 wherein controlling switching of traffic between selective and inclusive routes for the multicast comprises utilizing an inclusive route for the multicast responsive to a determination that:
    (i) traffic for the multicast is below a bandwidth threshold; or
    (ii) the number of receivers is above a delete threshold.

18. The method of claim 15 wherein controlling switching of traffic between the selective and inclusive routes for the multicast comprises:
    establishing a selective route based at least in part on the number of receivers determined in a first iteration being below an add threshold; and
    subsequently tearing down the selective route and transitioning to an inclusive route based at least in part on the number of receivers determined in a second iteration being above a delete threshold.

19. The method of claim 18 wherein controlling switching of traffic between the selective and inclusive routes for the multicast comprises again establishing a selective route based at least in part on the number of receivers determined in a third iteration being below the add threshold.

20. An article of manufacture comprising a non-transitory processor-readable storage medium having embodied therein executable program code that when executed by a network device causes the network device:
    to determine a number of receivers of a multicast; and
    to control switching of traffic between selective and inclusive routes for the multicast based at least in part on a comparison of the determined number of receivers to at least one threshold number of receivers.

* * * * *